United States Patent
Lai et al.

(10) Patent No.: US 11,845,451 B2
(45) Date of Patent: Dec. 19, 2023

(54) AUTOMOBILE DIAGNOSTIC METHOD, APPARATUS, DEVICE AND SYSTEM, AND DIAGNOSTIC CONNECTION DEVICE

(71) Applicant: AUTEL INTELLIGENT TECHNOLOGY CORP., LTD., Guangdong (CN)

(72) Inventors: Huigiang Lai, Guangdong (CN); Songsong Qu, Guangdong (CN)

(73) Assignee: AUTEL INTELLIGENT TECHNOLOGY CORP., LTD., Guangdong (CN)

( * ) Notice: Subject to any disclaimer, the term of this patent is extended or adjusted under 35 U.S.C. 154(b) by 802 days.

(21) Appl. No.: 16/923,956

(22) Filed: Jul. 8, 2020

(65) Prior Publication Data
US 2020/0339139 A1 Oct. 29, 2020

Related U.S. Application Data (63) Continuation of application No. PCT/CN2019/070752, filed on Jan. 8, 2019.

(30) Foreign Application Priority Data

Jan. 8, 2018 (CN) .......................... 201810016163.7

(51) Int. Cl.
| | |
|---|---|
| *B60W 50/02* | (2012.01) |
| *B60R 16/023* | (2006.01) |
| *G07C 5/08* | (2006.01) |

(52) U.S. Cl.
CPC ..... *B60W 50/0205* (2013.01); *B60R 16/0231* (2013.01); *G07C 5/0808* (2013.01); *G07C 2205/02* (2013.01)

(58) Field of Classification Search
CPC ........... B60W 50/0205; B60R 16/0231; G07C 5/0808; G07C 2205/02; G07C 5/0816;
(Continued)

(56) References Cited

U.S. PATENT DOCUMENTS

| | | | |
|---|---|---|---|
| 2005/0267655 A1 | 12/2005 | Gessner | |
| 2007/0086482 A1 | 4/2007 | Pruzan et al. | |
| 2013/0261882 A1* | 10/2013 | Bertosa | ................... G06F 17/00 |
| | | | 701/33.2 |

FOREIGN PATENT DOCUMENTS

| | | |
|---|---|---|
| CN | 101977275 A | 2/2011 |
| CN | 102073319 A | 5/2011 |

(Continued)

OTHER PUBLICATIONS

International Search Report dated Mar. 28, 2019; PCT/CN2019/070752.
The First Chinese Office Action dated Sep. 4, 2019; Appln. No. 201810016163.7.
First Chinese Office Action dated Jan. 18, 2021; Appln. No. 202010421399.6.
Extended European Search Report dated Jan. 25, 2022; Appln. No. 19736188.4.

*Primary Examiner* — Michael V Kerrigan (57) ABSTRACT

Embodiments of the present invention relate to automobile diagnostic methods, apparatuses, devices and systems, and a diagnostic connection devices. Embodiments include: a first interface connector module configured to read an operation performed by a user on an interface, and convert the operation into a corresponding diagnostic instruction; a first protocol converting module configured to convert the diagnostic instruction into standard transmission data corresponding to the diagnostic instruction; and a first software interface module configured to send the standard transmission data corresponding to the diagnostic instruction through the first communication unit. Further embodiments include protocol conversion between a physical layer and a data link layer that consumes memory resources and processor resources is totally or partially run on the automobile diagnostic device, allowing the diagnostic connection device (Continued)

to only partially (or not at all) run the protocol conversion between the physical layer and the data link layer.

14 Claims, 6 Drawing Sheets

(58) Field of Classification Search
CPC .... H04W 4/40; H04L 12/40032; H04L 69/08; G05B 23/0213
See application file for complete search history.

(56) References Cited

FOREIGN PATENT DOCUMENTS

| | | |
|---|---|---|
| CN | 102289227 A | 12/2011 |
| CN | 205247196 U | 5/2016 |
| CN | 106708010 A | 5/2017 |
| CN | 108199942 A | 6/2018 |

* cited by examiner

AUTOMOBILE DIAGNOSTIC METHOD, APPARATUS, DEVICE AND SYSTEM, AND DIAGNOSTIC CONNECTION DEVICE

This application is a continuation application of International Application No. PCT/CN2019/070752, filed on Jan. 8, 2019, which claims priority of Chinese Patent Application No. 201810016163.7, filed on Jan. 8, 2018, which is incorporated herein by reference in its entirety.

BACKGROUND

Technical Field

The present application relates to the field of automobile technologies, and in particular, to an automobile diagnostic method, apparatus, device and system, and a diagnostic connection device.

Related Art

As an important means of transportation, automobiles greatly improve quality of human life. With increasing importance of the automobiles in human life, a higher requirement is imposed on performance of the automobiles. At present, an automobile diagnostic system for detecting an automobile fault and performance is more widely applied. The automobile diagnostic system mainly connects an automobile network and PC-side diagnostic software through a diagnostic connection device such as a vehicle connection interface (VCI) device.

During implementation of the present invention, the inventor finds that there are at least the following problems in the prior art: Because a link protocol stack needs to be configured in the diagnostic connection device to implementation data conversion between a link layer and a physical layer, a lot of resources of a main chip in an automobile diagnostic device are consumed. As a result, a performance requirement for the main chip is relatively high, resulting in high hardware costs of the diagnostic connection device.

SUMMARY

Embodiments of the present invention provide an automobile diagnostic method, apparatus, device and system, and a diagnostic connection device, to reduce hardware costs of the diagnostic connection device.

According to a first aspect, an embodiment of the present invention provides an automobile diagnostic apparatus for an automobile diagnostic device, the automobile diagnostic device being configured to connect a diagnostic connection device to obtain detection data from an automobile network through the diagnostic connection device and including a first communication unit, where the diagnostic apparatus includes:

a first interface connector module configured to read an operation performed by a user on an interface, and convert the operation into a corresponding diagnostic instruction;

a first protocol converting module configured to convert the diagnostic instruction into standard transmission data corresponding to the diagnostic instruction; and a first software interface module configured to send the standard transmission data corresponding to the diagnostic instruction through the first communication unit.

Optionally, the first protocol converting module includes:

a first controller area network protocol submodule configured to convert the diagnostic instruction into controller area network protocol standard transmission data corresponding to the diagnostic instruction;

and/or a first communication bus protocol submodule configured to convert the diagnostic instruction into communication bus protocol standard transmission data corresponding to the diagnostic instruction.

Optionally, the first software interface module includes:

a synchronous sending module configured to synchronously send the standard transmission data corresponding to the diagnostic instruction.

Optionally, the first software interface module further includes:

an asynchronous sending module configured to asynchronously send the standard transmission data corresponding to the diagnostic instruction.

Optionally, the standard transmission data includes more than two data packets; and the asynchronous sending module is specifically configured to:

register a sending callback function that is used to call an asynchronous sending function; and call the asynchronous sending function to send a data packet in the standard transmission data, and perform returning to automatically call the sending callback function after the data packet is sent, so as to call the asynchronous sending function through the sending callback function to send another data packet in the standard transmission data.

According to a second aspect, an embodiment of the present invention provides an automobile diagnostic apparatus for an automobile diagnostic device, the automobile diagnostic device being configured to connect a diagnostic connection device to obtain detection data from an automobile network through the diagnostic connection device and including a first communication unit, where the diagnostic apparatus includes:

a second software interface module configured to receive standard transmission data corresponding to the detection data of the automobile network through the first communication unit; and a second protocol converting module configured to convert the standard transmission data corresponding to the detection data into detection data.

Optionally, the apparatus further includes:

a second interface connector module configured to parse the detection data to obtain a diagnosis result.

Optionally, the second protocol converting module includes:

a second controller area network protocol submodule configured to convert controller area network protocol standard transmission data corresponding to the detection data into detection data;

and/or a second communication bus protocol submodule configured to convert communication bus protocol standard transmission data corresponding to the detection data into detection data.

Optionally, the second software interface module includes:

a synchronous receiving module configured to synchronously receive the standard transmission data corresponding to the detection data of the automobile network.

Optionally, the second software interface module further includes:
an asynchronous receiving module configured to asynchronously receive the standard transmission data corresponding to the detection data of the automobile network.

Optionally, the standard transmission data includes more than two data packets; and
the asynchronous receiving module is specifically configured to:
register a receiving callback function that is used to call an asynchronous receiving function; and
after receiving a data packet in the standard transmission data, automatically call the receiving callback function to call the asynchronous receiving function through the receiving callback function to receive the data packet.

According to a third aspect, an embodiment of the present invention provides an automobile diagnostic method for an automobile diagnostic device, the automobile diagnostic device being configured to connect a diagnostic connection device to obtain detection data from an automobile network through the diagnostic connection device, where the diagnostic method includes:
reading an operation performed by a user on an interface, and converting the operation into a corresponding diagnostic instruction;
converting the diagnostic instruction into standard transmission data corresponding to the diagnostic instruction; and
sending the standard transmission data corresponding to the diagnostic instruction.

Optionally, the converting the diagnostic instruction into standard transmission data corresponding to the diagnostic instruction includes:
converting the diagnostic instruction into controller area network protocol standard transmission data corresponding to the diagnostic instruction, and/or converting the diagnostic instruction into communication bus protocol standard transmission data corresponding to the diagnostic instruction.

Optionally, the sending the standard transmission data corresponding to the diagnostic instruction includes:
synchronously sending the standard transmission data corresponding to the diagnostic instruction.

Optionally, the sending the standard transmission data corresponding to the diagnostic instruction further includes:
asynchronously sending the standard transmission data corresponding to the diagnostic instruction.

Optionally, the standard transmission data includes more than two data packets; and
the asynchronously sending the standard transmission data corresponding to the diagnostic instruction comprises:
registering a sending callback function that is used to call an asynchronous sending function; and
calling the asynchronous sending function to send a data packet in the standard transmission data, and performing returning to automatically call the sending callback function after the data packet is sent, so as to call the asynchronous sending function through the sending callback function to send another data packet in the standard transmission data.

According to a fourth aspect, an embodiment of the present invention provides an automobile diagnostic method for an automobile diagnostic device, the automobile diagnostic device being configured to connect a diagnostic connection device to obtain detection data from an automobile network through the diagnostic connection device, where the diagnostic method includes:
receiving standard transmission data corresponding to the detection data of the automobile network; and
converting the standard transmission data corresponding to the detection data into detection data.

Optionally, the method further includes:
parsing the detection data to obtain a diagnosis result.

Optionally, the converting the standard transmission data corresponding to the detection data into detection data includes:
converting controller area network protocol standard transmission data corresponding to the detection data into detection data, and/or converting communication bus protocol standard transmission data corresponding to the detection data into detection data.

Optionally, the receiving standard transmission data corresponding to the detection data of the automobile network includes:
synchronously receiving the standard transmission data corresponding to the detection data of the automobile network.

Optionally, the receiving standard transmission data corresponding to the detection data of the automobile network further includes:
asynchronously receiving the standard transmission data corresponding to the detection data of the automobile network.

Optionally, the standard transmission data includes more than two data packets; and
the asynchronously receiving the standard transmission data corresponding to the detection data of the automobile network comprises:
registering a receiving callback function that is used to call an asynchronous receiving function; and
after a data packet in the standard transmission data is received, automatically calling the receiving callback function to call the asynchronous receiving function through the receiving callback function to receive the data packet.

According to a fifth aspect, an embodiment of the present invention provides an automobile diagnostic method for a diagnostic connection device, the diagnostic connection device being configured to connect an automobile diagnostic device and an automobile network, where the method includes:
receiving standard transmission data that is corresponding to a diagnostic instruction and that is sent by the automobile diagnostic device;
sending the standard transmission data corresponding to the diagnostic instruction to the automobile network;
receiving standard transmission data that is corresponding to detection data and that is sent by the automobile network; and
sending the standard transmission data corresponding to the detection data to the automobile diagnostic device.

According to a sixth aspect, an embodiment of the present invention provides an automobile diagnostic apparatus for a diagnostic connection device, the diagnostic connection device being configured to connect an automobile diagnostic device and an automobile network, where the apparatus includes:
a first receiving module configured to receive standard transmission data that is corresponding to a diagnostic instruction and that is sent by the automobile diagnostic device;

a first sending module configured to send the standard transmission data corresponding to the diagnostic instruction to the automobile network;

a second receiving module configured to receive standard transmission data that is corresponding to detection data and that is sent by the automobile network; and a second sending module configured to send the standard transmission data corresponding to the detection data to the automobile diagnostic device.

According to a seventh aspect, an embodiment of the present invention provides an automobile diagnostic device, including:

a display screen;

a first communication unit configured to send and receive data;

at least one processor; and a memory communicatively connected to the at least one processor, where the memory stores an instruction that may be executed by the at least one processor, and when executed by the at least one processor, the instruction causes the at least one processor to perform the method in the third aspect or the fourth aspect.

According to an eighth aspect, an embodiment of the present invention provides a diagnostic connection device, including:

a second communication unit configured to send and receive data;

at least one communication controller connected to the second communication unit and configured to control a bus to transmit data;

at least one bus connected to the communication controller and configured to transmit data; and a diagnostic interface connected to the bus and configured to connect to an automobile network, the communication controller including:

at least one processor; and a memory communicatively connected to the at least one processor, where the memory stores an instruction that may be executed by the at least one processor, and when executed by the at least one processor, the instruction causes the at least one processor to perform the method in the fifth aspect.

According to a ninth aspect, an embodiment of the present invention provides an automobile diagnostic system, including:

the foregoing automobile diagnostic device and the foregoing diagnostic connection device.

According to a tenth aspect, an embodiment of the present invention provides a non-volatile computer readable storage medium. The computer readable storage medium stores a computer executable instruction, and when executed by an automobile diagnostic device, the computer executable instruction causes the automobile diagnostic device to perform the method in the third aspect or the fourth aspect.

According to an eleventh aspect, an embodiment of the present invention provides a computer program product. The computer program product includes a computer program stored on a non-volatile computer readable storage medium and including a program instruction, and when executed by an automobile diagnostic device, the program instruction causes the automobile diagnostic device to perform the method in the third aspect or the fourth aspect.

Beneficial effects of the embodiments of the present invention are as follows: In the embodiments of the present invention, protocol conversion between a physical layer and a data link layer that consumes memory resources and processor resources is totally or partially run on the automobile diagnostic device, and therefore the diagnostic connection device only needs to partially run the protocol conversion between the physical layer and the data link layer or does not need to run the protocol conversion between at the physical layer and the data link layer. In this way, a requirement of the diagnostic connection device for hardware performance is lowered and hardware costs of the diagnostic connection device are reduced.

BRIEF DESCRIPTION OF THE DRAWINGS

One or more embodiments are exemplified by the pictures in the accompanying drawings. These exemplary descriptions do not constitute a limitation on the embodiments. Elements with the same reference numerals in the accompanying drawings are denoted as similar elements. Unless otherwise stated, the pictures in the accompanying drawings do not constitute a limitation on scale.

DETAILED DESCRIPTION

In order to make the objectives, technical solutions, and advantages of the embodiments of the present invention clearer, the technical solutions in the embodiments of the present invention will be clearly and completely described with reference to the accompanying drawings in the embodiments of the present invention. It is a part of the embodiments of the present invention, but not all the embodiments. Based on the embodiments of the present invention, all other embodiments obtained by a person of ordinary skill in the art without creative efforts shall fall within the protection scope of the present invention.

Figure 1:
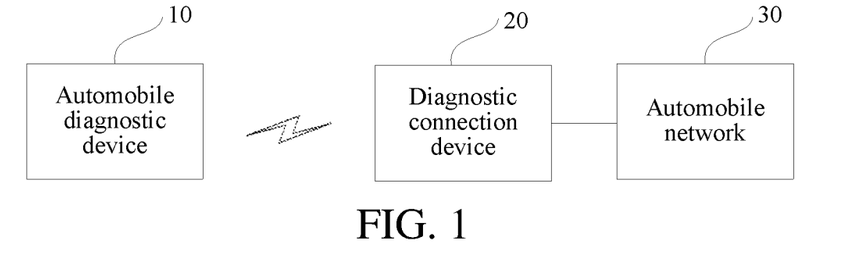
FIG. 1 is a schematic diagram of an application scenario of an automobile diagnostic method and apparatus according to an embodiment of the present invention.

An automobile diagnostic method and apparatus provided in embodiments of the present invention are applicable to an application scenario shown in FIG. 1. The application scenario includes an automobile diagnostic device 10, a diagnostic connection device 20 and an automobile network 30. The automobile network 30 is a to-be-detected object, which includes an electronic control module of an automobile, and may detect detection data such as running data and fault codes of various parts of the automobile. The diagnostic connection device 20 is, for example, a vehicle connection interface (VCI) device, which is a bridge for communication between diagnostic software in the automobile diagnostic device 10 and the automobile network 30, and is responsible for transmitting a diagnostic instruction of the automobile diagnostic device 10 to the automobile network 30 and transmitting, to the automobile diagnostic device 10, detection data returned by the automobile network 30. The automobile diagnostic device 10 and the diagnostic connection device 20 may be wiredly connected through a communication serial port, a USB interface, or the like, or may be wirelessly connected through Bluetooth, Wi-Fi, or the like. The diagnostic connection device 20 and the automobile network 30 are connected through a diagnostic interface such as an on-board diagnostic (OBD) interface.

The automobile diagnostic device 10 is a device that can run diagnostic software, such as a personal computer or a smartphone, or a diagnostic device provided specifically. In actual application, the automobile diagnostic device 10 and the diagnostic connection device 20 may be sold together, or the diagnostic connection device 20 may be sold separately and used in combination with the automobile diagnostic device such as a personal computer or a smartphone to diagnose the automobile network. The diagnostic software provides a human-computer interaction interface, and a user may select a diagnostic function by operating the interface. The diagnostic software converts the diagnostic function selected by the user into a diagnostic instruction, and sends the diagnostic instruction to the automobile network 30 through the diagnostic connection device 20. The automobile network 30 obtains detection data corresponding to the diagnostic instruction based on the diagnostic instruction, and sends the detection data to the automobile diagnostic device 10 through the diagnostic connection device 20. The diagnostic software of the automobile diagnostic device 10 parse the detection data fed back by the automobile network 30 to obtain a diagnosis result, and displays the diagnosis result to the user.

Figure 2A:
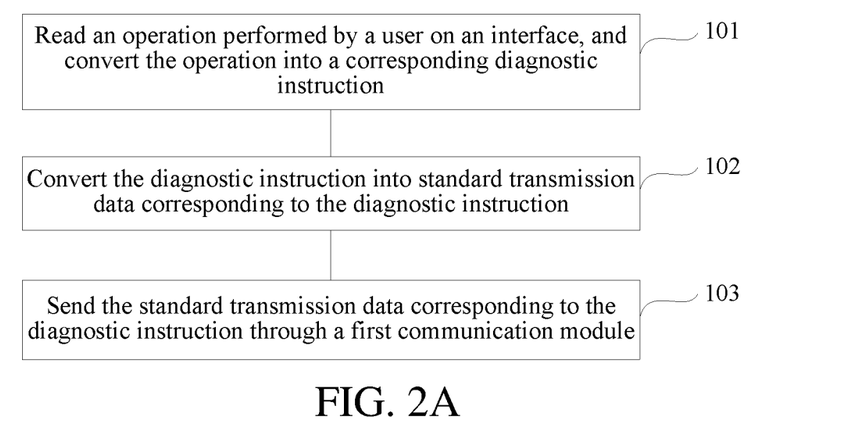
FIG. 2A is a schematic flowchart of an embodiment of an automobile diagnostic method for an automobile diagnostic device side according to the present invention.

FIG. 2A is a schematic flowchart of an automobile diagnostic method according to an embodiment of the present invention. The method may be performed by the automobile diagnostic device 10 in FIG. 1. As shown in FIG. 2, the diagnostic method includes the following steps.

101. An operation performed by a user on an interface is read, and the operation is converted into a corresponding diagnostic instruction.

In actual application, the automobile diagnostic method may be implemented in a form of automobile diagnostic software. The automobile diagnostic software has a human-machine interaction interface that may be displayed on a display screen of the automobile diagnostic device 10. The user may operate the diagnostic software through a button and the display screen, such as selecting a selection bus, a bus controller type and a diagnostic function, and setting a parameter of the diagnostic connection device 20. When the automobile network 30 includes a plurality of electronic control modules, the electronic control modules may be further selected. The automobile diagnostic device 10 converts the operation performed by the user on the interface into the diagnostic instruction.

102. The diagnostic instruction is converted into standard transmission data corresponding to the diagnostic instruction.

Because the diagnostic instruction needs to be transmitted to the automobile network 30 through a bus, the diagnostic instruction needs to be converted into a bus transmission data protocol format of a physical layer, that is, protocol conversion is performed between a data link layer and the physical layer. When the automobile network includes a controller area network (CAN) bus, a kommunikation (K) bus and the like, the diagnostic instruction may be converted into a CAN bus data protocol format, a K bus data protocol format and the like.

In the current diagnostic method, the foregoing conversion between the data link layer and the physical layer is performed in the diagnostic connection device 20. Because the conversion consumes a lot of resources of a main chip in the diagnostic connection device 20, a performance requirement for the main chip is relatively high, resulting in high hardware costs of the diagnostic connection device 20. In this embodiment, the protocol conversion between the link layer and the physical layer is placed in the diagnostic software, that is, in the automobile diagnostic device 10. Because the automobile diagnostic device 10 such as a personal computer or a smartphone has high performance and is capable of running most software, the protocol conversion is run on the automobile diagnostic device 10, so that hardware costs of the diagnostic connection device 20 are reduced without increasing hardware costs of the automobile diagnostic device 10.

Optionally, the protocol conversion may be totally or partially run on the automobile diagnostic device 10. For example, both conversion of the diagnostic instruction into CAN bus protocol standard transmission data and conversion of the diagnostic instruction into K bus protocol standard transmission data are run on the automobile diagnostic device 10, or only conversion of the diagnostic instruction into CAN bus protocol standard transmission data is run on the automobile diagnostic device 10, and conversion of the diagnostic instruction into K bus protocol standard transmission data is run on the diagnostic connection device 20.

103: The standard transmission data corresponding to the diagnostic instruction is sent.

In actual application, the standard transmission data corresponding to the diagnostic instruction may be sent to the diagnostic connection device 20 through a communication unit of the automobile diagnostic device 10. The communication unit is, for example, a serial communication unit, a USB communication unit, a Bluetooth communication unit and a Wi-Fi communication unit.

Figure 2B:
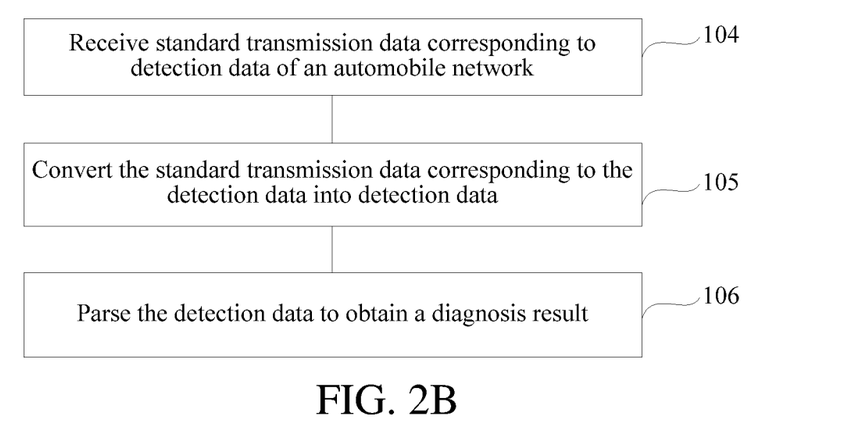
FIG. 2B is a schematic flowchart of an embodiment of an automobile diagnostic method for an automobile diagnostic device side according to the present invention.

By perform steps 101, 102 and 103, the automobile diagnostic device 10 sends the diagnostic instruction to the automobile network 30 through the diagnostic connection device 20. After receiving the diagnostic instruction sent by the automobile diagnostic device 10, the automobile network 30 detects an electronic control module of an automobile based on the diagnostic instruction, and obtains corresponding detection data. The automobile network 30 converts the detection data into standard transmission data that complies with a bus transmission standard, and sends the standard transmission data to the automobile diagnostic device 10 through the diagnostic connection device 20. After receiving the standard transmission data corresponding to the detection data, the automobile diagnostic device 10 processes the standard transmission data. Referring to FIG. 2B, details are as follows:

104. Standard transmission data corresponding to detection data of the automobile network is received.

105. The standard transmission data corresponding to the detection data is converted into detection data.

The automobile diagnostic device 10 performs protocol conversion between a physical layer and a data link layer on the standard transmission data corresponding to the detection data to obtain the detection data. Optionally, the protocol conversion for the detection data may be totally or partially run on the automobile diagnostic device 10. For example, both conversion of CAN bus protocol standard transmission data into detection data and conversion of K bus protocol standard transmission data into detection data are run on the automobile diagnostic device 10, or only conversion of CAN bus protocol standard transmission data into detection data is run on the automobile diagnostic device 10 and conversion of K bus protocol standard transmission data into detection data is run on the diagnostic connection device 20.

106. The detection data is parsed to obtain a diagnosis result.

The automobile diagnostic device 10 parses the detection data to obtain a diagnosis result of the automobile network 30.

In this embodiment of the present invention, protocol conversion between a physical layer and a data link layer that consumes memory resources and processor resources is totally or partially run on the automobile diagnostic device 10, and therefore the diagnostic connection device 20 only needs to partially run the protocol conversion between the physical layer and the data link layer or does not need to run the protocol conversion between the physical layer and the data link layer. In this way, a requirement of the diagnostic connection device 20 for hardware performance is lowered and hardware costs of the diagnostic connection device 20 are reduced.

Optionally, the automobile diagnostic device 10 may synchronously or asynchronously send the standard transmission data corresponding to the diagnostic instruction to the diagnostic connection device 20. The automobile diagnostic device 10 may synchronously or asynchronously receive the standard transmission data that is corresponding to the detection data and that is sent by the diagnostic connection equipment 20. The automobile diagnostic device 10 may send data to the diagnostic connection device 20 and receive data from the diagnostic connection device 20 by setting a software interface function for accessing the diagnostic connection device 20 on the automobile diagnostic device 10. That is, a synchronous sending function, a synchronous receiving function, and/or a sending callback function, a receiving callback function, an asynchronous sending function and an asynchronous receiving function are set.

Figure 3:
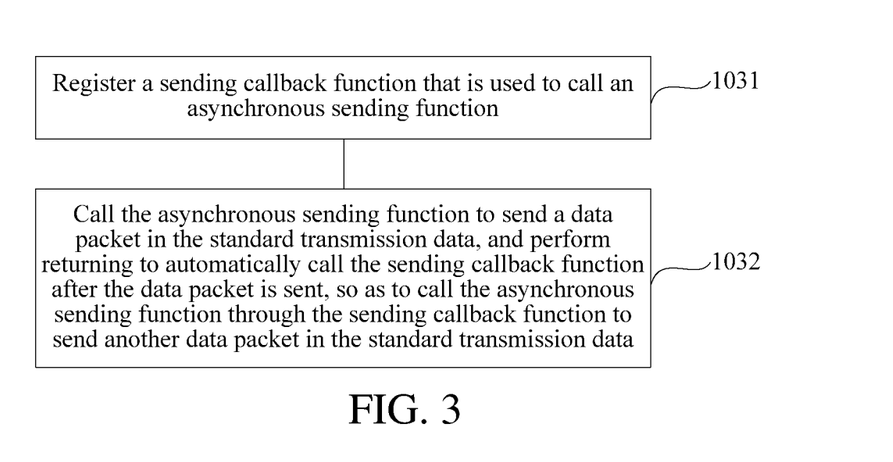
FIG. 3 is a schematic flowchart of asynchronously sending data in an embodiment of an automobile diagnostic method for an automobile diagnostic device side according to the present invention.

Specifically, as shown in FIG. 3, that the automobile diagnostic device 10 asynchronously sends the standard transmission data corresponding to the diagnostic instruction includes:

1031. A sending callback function that is used to call an asynchronous sending function is registered.

Before the sending callback function is registered, a controller device needs to be enabled. For example, if the user selects a CAN bus, a communication controller of the CAN bus and the CAN bus need to be enabled.

1032. The asynchronous sending function is called to send a data packet in the standard transmission data, and returning is performed to automatically call the sending callback function after the data packet is sent, so as to call the asynchronous sending function through the sending callback function to send another data packet in the standard transmission data.

The standard transmission data includes a plurality of data packets, and the asynchronous sending function is called to sequentially send the plurality of data packets included in the standard transmission data. The automobile diagnostic device 10 first calls the asynchronous sending function to send a data packet, and function returning is performed to automatically call the sending callback function after the data packet is sent, so as to call the asynchronous sending function through the sending callback function to transmit another data packet until the standard transmission data is all sent.

Figure 4:
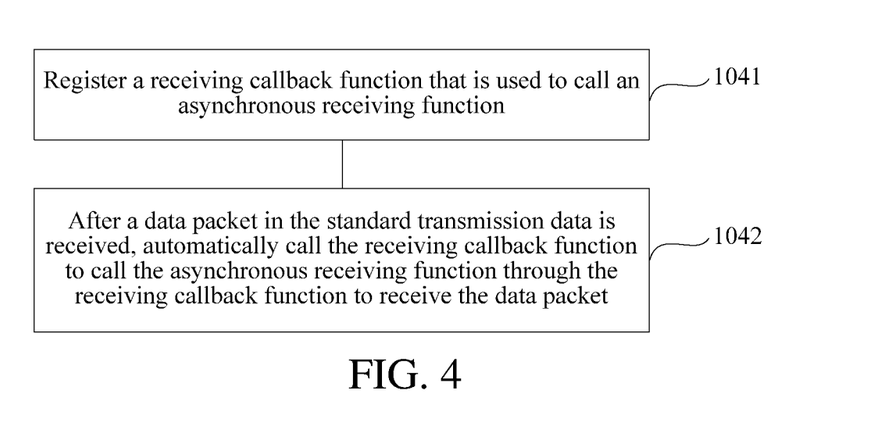
FIG. 4 is a schematic flowchart of asynchronously receiving data in an embodiment of an automobile diagnostic method for an automobile diagnostic device side according to the present invention.

As shown in FIG. 4, that the automobile diagnostic device 10 asynchronously receives the standard transmission data corresponding to the detection data of the automobile network 30 specifically includes:

1041. A receiving callback function that is used to call an asynchronous receiving function is registered.

1042. After a data packet in the standard transmission data is received, the receiving callback function is automatically called to call the asynchronous receiving function through the receiving callback function to receive the data packet.

After receiving the data packet in the standard transmission data, the automobile diagnostic device 10 automatically calls the receiving callback function to call the asynchronous receiving function through the receiving callback function to receive the data packet in the standard transmission data.

An asynchronous communication software interface is provided to support a plurality of logical link objects of a same protocol or different protocols in simultaneously accessing a software interface function, so that data transmission efficiency is high.

Figure 5:
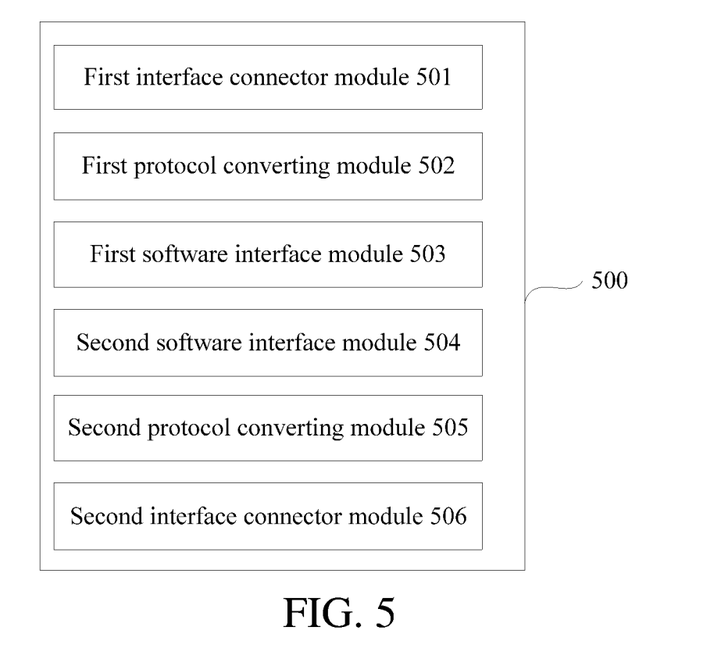
FIG. 5 is a schematic structural diagram of an embodiment of an automobile diagnostic apparatus for an automobile diagnostic device side according to the present invention.

Correspondingly, an embodiment of the present invention further provides an automobile diagnostic apparatus for the automobile diagnostic device 10 in FIG. 1. The automobile diagnostic device 10 includes a first communication unit. Referring to FIG. 5, a diagnostic apparatus 500 includes:
 a first interface connector module 501 configured to read an operation performed by a user on an interface, and convert the operation into a corresponding diagnostic instruction;
 a first protocol converting module 502 configured to convert the diagnostic instruction into standard transmission data corresponding to the diagnostic instruction; and
 a first software interface module 503 configured to send the standard transmission data corresponding to the diagnostic instruction through the first communication unit.

In this embodiment of the present invention, protocol conversion between a physical layer and a data link layer that consumes memory resources and processor resources is totally or partially run on the automobile diagnostic device 10, and therefore a diagnostic connection device 20 only needs to partially run the protocol conversion between the physical layer and the data link layer or does not need to run the protocol conversion between the physical layer and the data link layer. In this way, a requirement of the diagnostic connection device 20 for hardware performance is lowered and hardware costs of the diagnostic connection device 20 are reduced.

Figure 6:
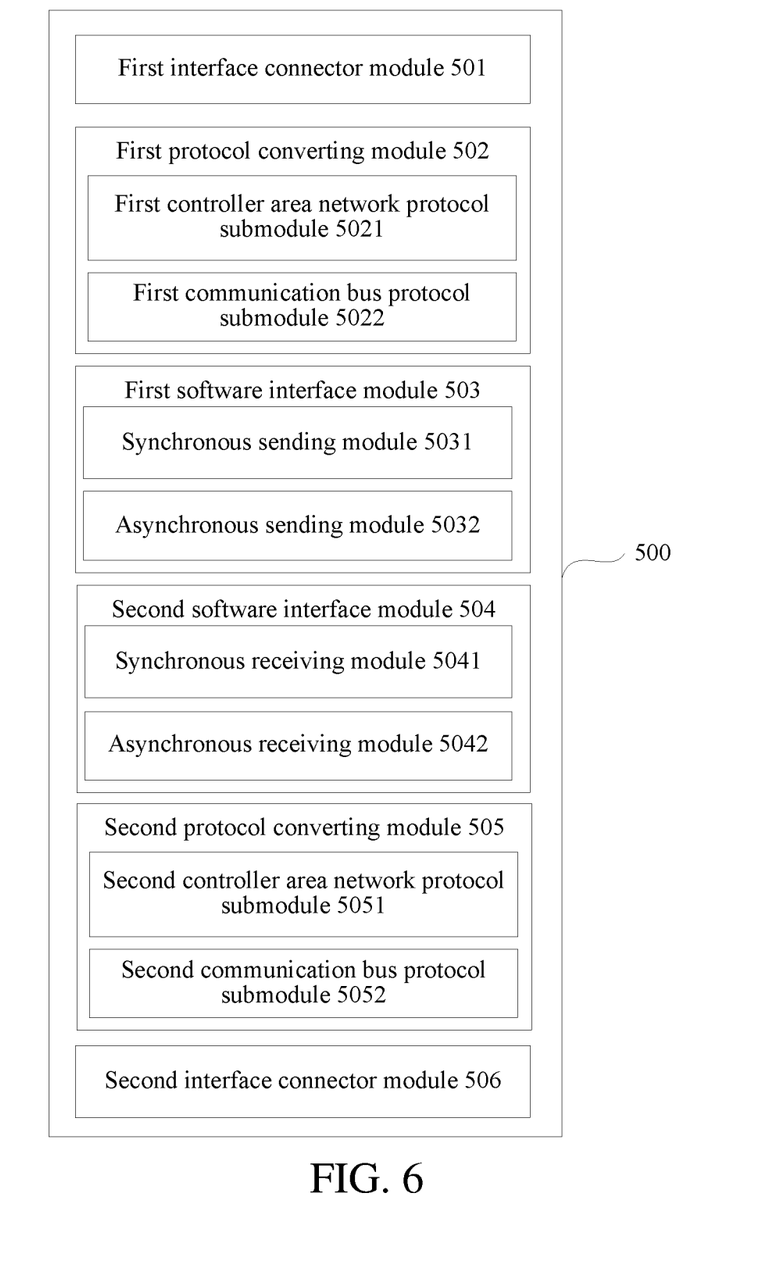
FIG. 6 is a schematic structural diagram of an embodiment of an automobile diagnostic apparatus for an automobile diagnostic device side according to the present invention.

Optionally, in some embodiments of the diagnostic apparatus 500, referring to FIG. 6, the first protocol converting module 502 includes:
- a first controller area network protocol submodule 5021 configured to convert the diagnostic instruction into controller area network protocol standard transmission data corresponding to the diagnostic instruction; and/or
- a first communication bus protocol submodule 5022 configured to convert the diagnostic instruction into communication bus protocol standard transmission data corresponding to the diagnostic instruction.

Optionally, in some embodiments of the diagnostic apparatus 500, referring to FIG. 6, the first software interface module 503 includes:
- a synchronous sending module 5031 configured to synchronously send the standard transmission data corresponding to the diagnostic instruction.

Optionally, in some embodiments of the diagnostic apparatus 500, referring to FIG. 6, the first software interface module 503 further includes:
- an asynchronous sending module 5032 configured to asynchronously send the standard transmission data corresponding to the diagnostic instruction.

Optionally, in some embodiments of the diagnostic apparatus 500, the standard transmission data includes more than two data packets; and
the asynchronous sending module 5032 is specifically configured to:
register a sending callback function that is used to call an asynchronous sending function; and
call the asynchronous sending function to send a data packet in the standard transmission data, and perform returning to automatically call the sending callback function after the data packet is sent, so as to call the asynchronous sending function through the sending callback function to send another data packet in the standard transmission data.

It should be noted that the automobile diagnostic apparatus may perform the automobile diagnostic method provided in the embodiments of the present application, and has corresponding function modules and beneficial effects for performing the automobile diagnostic method. For technical details that are not described in detail in the apparatus embodiment, refer to the automobile diagnostic method provided in the embodiments of the present application.

An embodiment of the present invention further provides an automobile diagnostic apparatus for the automobile diagnostic device 10 in FIG. 1. The automobile diagnostic device 10 includes a first communication unit. Referring to FIG. 5, a diagnostic apparatus 500 includes:
- a second software interface module 504 configured to receive standard transmission data corresponding to detection data of an automobile network through the first communication unit; and
- a second protocol converting module 505 configured to convert the standard transmission data corresponding to the detection data into detection data.

In this embodiment of the present invention, protocol conversion between a physical layer and a data link layer that consumes memory resources and processor resources is totally or partially run on the automobile diagnostic device 10, and therefore a diagnostic connection device 20 only needs to partially run the protocol conversion between the physical layer and the data link layer or does not need to run the protocol conversion between the physical layer and the data link layer. In this way, a requirement of the diagnostic connection device 20 for hardware performance is lowered and hardware costs of the diagnostic connection device 20 are reduced.

Optionally, in some embodiments of the diagnostic apparatus 500, referring to FIG. 5, the diagnostic apparatus 500 further includes:
- a second interface connector module 506 configured to parse the detection data to obtain a diagnosis result.

Optionally, in some embodiments of the diagnostic apparatus 500, referring to FIG. 6, the second protocol converting module 505 includes:
- a second controller area network protocol submodule 5051 configured to convert controller area network protocol standard transmission data corresponding to the detection data into detection data; and/or
- a second communication bus protocol submodule 5052 configured to convert communication bus protocol standard transmission data corresponding to the detection data into detection data.

Optionally, in some embodiments of the diagnostic apparatus 500, referring to FIG. 6, the second software interface module 504 includes:
- a synchronous receiving module 5041 configured to synchronously receive the standard transmission data corresponding to the detection data of the automobile network.

Optionally, in some embodiments of the diagnostic apparatus 500, referring to FIG. 6, the second software interface module 504 further includes:
- an asynchronous receiving module 5042 configured to asynchronously receive the standard transmission data corresponding to the detection data of the automobile network.

Optionally, in some embodiments of the diagnostic apparatus 500, the standard transmission data includes more than two data packets; and
the asynchronous receiving module 5042 is specifically configured to:
register a receiving callback function that is used to call an asynchronous receiving function; and
after receiving a data packet in the standard transmission data, automatically call the receiving callback function to call the asynchronous receiving function through the receiving callback function to receive the data packet.

It should be noted that the automobile diagnostic apparatus may perform the automobile diagnostic method provided in the embodiments of the present application, and has corresponding function modules and beneficial effects for performing the automobile diagnostic method. For technical details that are not described in detail in the apparatus embodiment, refer to the automobile diagnostic method provided in the embodiments of the present application.

Figure 7:
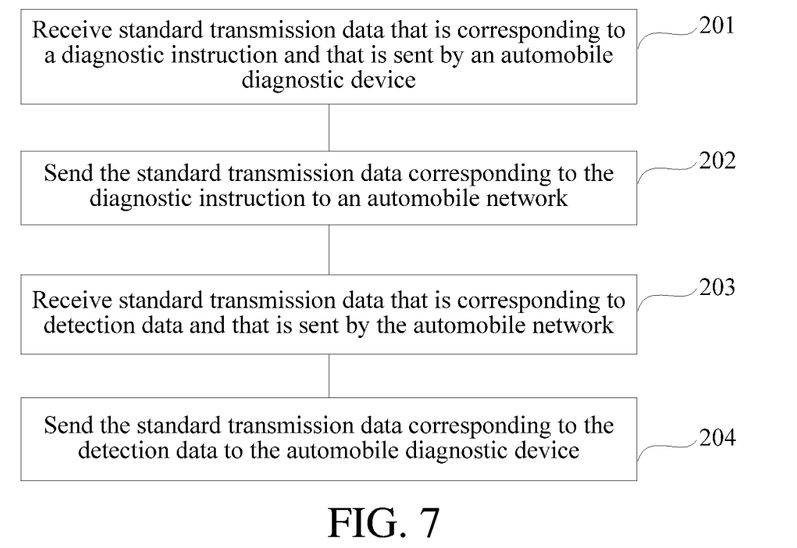
FIG. 7 is a schematic flowchart of an embodiment of an automobile diagnostic method for a diagnostic connection device side according to the present invention.

An embodiment of the present invention further provides an automobile diagnostic method for the diagnostic connection device 20 in FIG. 1. Referring to FIG. 7, the method includes the following steps.

201. Standard transmission data that is corresponding to a diagnostic instruction and that is sent by an automobile diagnostic device is received.

202. The standard transmission data corresponding to the diagnostic instruction is sent to an automobile network.

After receiving the standard transmission data corresponding to the diagnostic instruction through the communication unit, the diagnostic connection device 20 uses a communication controller selected by a user to control a corresponding bus to send the standard transmission data.

203. Standard transmission data that is corresponding to detection data and that is sent by the automobile network is received.

204. The standard transmission data corresponding to the detection data is sent to the automobile diagnostic device.

After receiving the standard transmission data that is corresponding to the detection data and that is fed back by the automobile network 30 through bus transmission, the diagnostic connection device 20 sends the standard transmission data to an automobile diagnostic device 10 through the communication unit.

In this embodiment of the present invention, protocol conversion between a physical layer and a data link layer that consumes memory resources and processor resources is run on the automobile diagnostic device 10, and therefore the diagnostic connection device 20 does not need to run the protocol conversion between the physical layer and the data link layer. In this way, a requirement of the diagnostic connection device 20 for hardware performance is lowered and hardware costs of the diagnostic connection device 20 are reduced.

Figure 8:
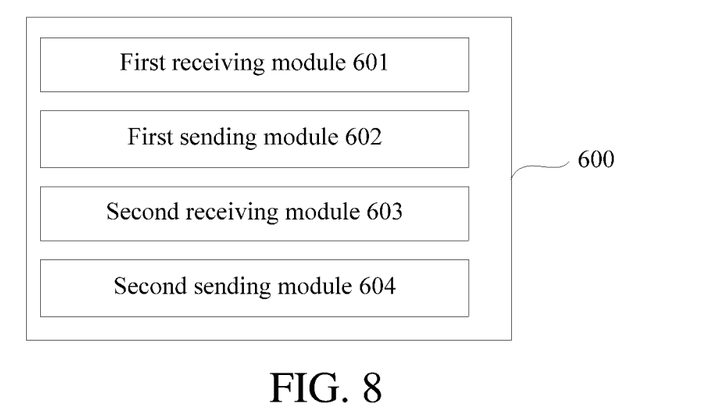
FIG. 8 is a schematic structural diagram of an embodiment of an automobile diagnostic apparatus for a diagnostic connection device side according to the present invention.

Correspondingly, an embodiment of the present invention further provides an automobile diagnostic apparatus for the diagnostic connection device 20 in FIG. 1. As shown in FIG. 8, a diagnostic apparatus 600 includes:
- a first receiving module 601 configured to receive standard transmission data that is corresponding to a diagnostic instruction and that is sent by the automobile diagnostic device;
- a first sending module 602 configured to send the standard transmission data corresponding to the diagnostic instruction to the automobile network;
- a second receiving module 603 configured to receive standard transmission data that is corresponding to detection data and that is sent by the automobile network; and
- a second sending module 604 configured to send the standard transmission data corresponding to the detection data to the automobile diagnostic device.

In this embodiment of the present invention, protocol conversion between a physical layer and a data link layer that consumes memory resources and processor resources is run on an automobile diagnostic device 10, and therefore the diagnostic connection device 20 does not need to run the protocol conversion between the physical layer and the data link layer. In this way, a requirement of the diagnostic connection device 20 for hardware performance is lowered and hardware costs of the diagnostic connection device 20 are reduced.

Figure 9:
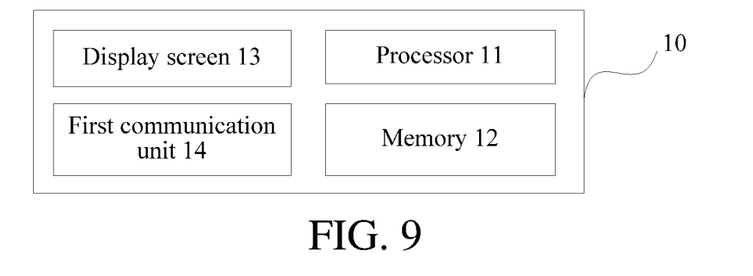
FIG. 9 is a schematic diagram of a hardware structure of an automobile diagnostic device according to an embodiment of the present invention.

FIG. 9 is a schematic diagram of a hardware structure of an automobile diagnostic device 10 according to an embodiment of the present invention. As shown in FIG. 9, the automobile diagnostic device 10 includes:
- a display screen 13 and a first communication unit 14, where the first communication unit 14 is configured to receive and send data, and the first communication unit 14 is, for example, a serial communication unit, a USB communication unit, a Bluetooth communication unit and a Wi-Fi communication unit; and
- one or more processors 11 and a memory 12, where one processor 11 is used as an example in FIG. 9, and the processor 11 and the memory 12 may be connected through a bus or in other manners.

The memory 12, as a non-volatile computer readable storage medium, may be configured to store a non-volatile software program, a non-volatile computer executable program and a module, such as a program instruction/unit corresponding to the diagnostic method in the embodiments of the present invention (for example, the first interface connector module 501, the first protocol converting module 502, the first software interface module 503, the second software interface module 504, the second protocol converting module 505 and the second interface connector module 506 in FIG. 5). The processor 11 executes various function applications and data processing of the automobile diagnostic device 10 by running the non-volatile software program, instruction and unit stored in the memory 12, that is, the diagnostic method provided in the foregoing method embodiment is implemented.

The memory 12 may include a program storage area and a data storage area. The program storage area may store an operating system, and an application program required for at least one function. The data storage area may store data and the like created based on use of the automobile diagnostic device 10. In addition, the memory 12 may include a high speed random access memory, and may further include a non-volatile memory, such as at least one magnetic disk storage device, a flash memory device or other non-volatile solid-state storage devices. In some embodiments, the memory 12 may optionally include remotely disposed memories relative to the processor 11, and these remote memories may be connected to the automobile diagnostic device 10 via a network. An example of the foregoing network includes, but is not limited to, the Internet, an intranet, a local area network, a mobile communications network, and a combination thereof.

The one or more units are stored in the memory 12, and when executed by the one or more processors 11, perform the diagnostic method in any of the foregoing method embodiments, for example, perform steps 101 to 103 of the method in FIG. 2A, steps 104 to 106 of the method in FIG. 2B, steps 1031 and 1032 of the method in FIG. 3 and steps 1041 and 1042 of the method in FIG. 4 described above to implement functions of the modules 501 to 506 in FIG. 5, and modules 501 to 506, submodules 5021 and 5022, submodules 5031 and 5032 and submodules 5051 and 5052 in FIG. 6.

The automobile diagnostic device 10 may perform the automobile diagnostic method provided in the embodiments of the present invention, and has corresponding function modules and beneficial effects for performing the method. For technical details that are not described in detail in the embodiment of the automobile diagnostic device 10, refer to the method provided in the embodiments of the present invention.

The automobile diagnostic device 10 in this embodiment of the present invention exists in various forms, including but not limited to:
 (1) Mobile communication device: This type of device is characterized by a mobile communication function, and is mainly intended to provide voice and data communication. Such terminals include a smartphone (such as iPhone), a multimedia phone, a feature phone, a low-end phone and the like.
 (2) Ultra-mobile personal computer device: This type of device belongs to a category of personal computers, has computing and processing functions, and is usually characterized by mobile Internet access. Such terminals include a PDA, a MID, a UMPC device and the like, such as iPad.

(3) Portable entertainment device: This type of device may display and play multimedia content. Such devices include an audio and video player (such as iPod), a handheld game console, an e-book, a smart toy and a portable vehicle navigation device.

(4) Server: including a device that provides a computing service. The server includes a processor, a hard disk, a memory, a system bus and the like. An architecture of the server is similar to that of a general computer. However, because the server needs to provide a highly reliable service, the server requires a higher processing capability, and higher stability, reliability, security, scalability and manageability.

An embodiment of the present invention further provides a non-volatile computer readable storage medium. The computer readable storage medium stores a computer executable instruction, and the computer executable instruction is executed by one or more processors. For example, steps 101 to 103 of the method in FIG. 2A, steps 104 to 106 of the method in FIG. 2B, steps 1031 and 1032 of the method in FIG. 3 and steps 1041 and 1042 of the method in FIG. 4 described above are performed to implement functions of the modules 501 to 506 in FIG. 5, and modules 501 to 506, submodules 5021 and 5022, submodules 5031 and 5032 and submodules 5051 and 5052 in FIG. 6.

Figure 10:
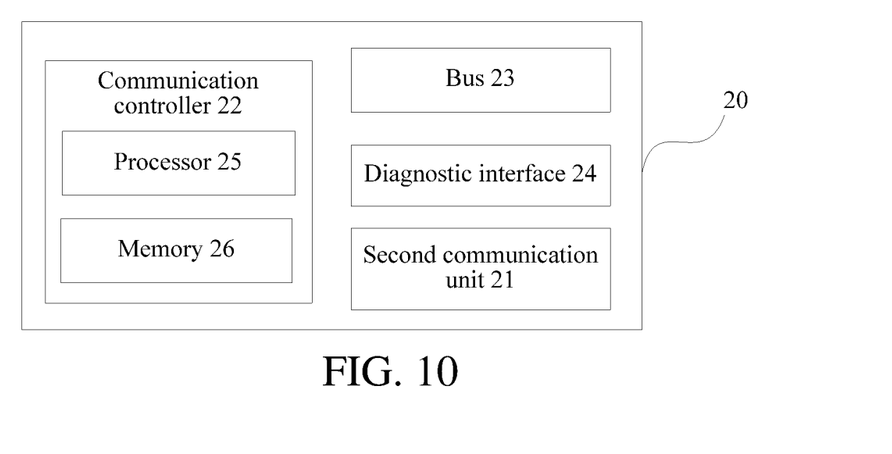
FIG. 10 is a schematic diagram of a hardware structure of a diagnostic connection device according to an embodiment of the present invention.

FIG. 10 is a schematic diagram of a hardware structure of a diagnostic connection device 20 according to an embodiment of the present invention. As shown in FIG. 10, the diagnostic connection device 20 includes:

a second communication unit 21, at least one communication controller 22, at least one bus 23 (one communication controller 22 and one bus 23 are used as an example for illustration in FIG. 10) and a diagnostic interface 24. The second communication unit 21 is sequentially connected through the communication controller 22, the bus 23 and the diagnostic interface 24. The second communication unit 21 is configured to send and receive data, the communication controller 22 is configured to control the bus 23 to transmit data, the bus 23 is configured to transmit data, and the diagnostic interface 24 is configured to connect an automobile network.

The second communication unit 21 is, for example, a serial communication unit, a USB communication unit, a Bluetooth communication unit, or a Wi-Fi communication unit. The communication controller 22 is, for example, a CAN bus controller or a K bus controller. The bus 23 is, for example, a CAN bus or a K bus. The diagnostic interface 24 is, for example, an OBD interface.

The communication controller 22 includes one or more processors 25 and a memory 26, and one processor 25 is used as an example in FIG. 10. The processor 25 and the memory 26 may be connected through a bus or in other manners.

The memory 26, as a non-volatile computer readable storage medium, may be configured to store a non-volatile software program, a non-volatile computer executable program and a module, such as a program instruction/unit corresponding to the diagnostic method in the embodiments of the present invention (for example, the first receiving module 601, the first sending module 602, the second receiving module 603 and the second sending module 604 in FIG. 8). The processor 25 executes various function applications and data processing of the diagnostic connection device 20 by running the non-volatile software program, instruction and unit stored in the memory 26, that is, the diagnostic method provided in the foregoing method embodiment is implemented.

The memory 26 may include a program storage area and a data storage area. The program storage area may store an operating system, and an application program required for at least one function. The data storage area may store data and the like created based on use of the diagnostic connection device 20. In addition, the memory 26 may include a high speed random access memory, and may further include a non-volatile memory, such as at least one magnetic disk storage device, a flash memory device or other non-volatile solid-state storage devices. In some embodiments, the memory 26 may optionally include remotely disposed memories relative to the processor 25, and these remote memories may be connected to the diagnostic connection device 20 via a network. An example of the foregoing network includes, but is not limited to, the Internet, an intranet, a local area network, a mobile communications network, and a combination thereof.

The one or more units are stored in the memory 26, and when executed by the one or more processors 25, perform the diagnostic method in any of the foregoing method embodiments, for example, perform steps 201 to 204 of the method in FIG. 7 described above to implement functions of the modules 601 to 604 in FIG. 8.

The diagnostic connection device 20 may perform the automobile diagnostic method provided in the embodiments of the present invention, and has corresponding function modules and beneficial effects for performing the method. For technical details that are not described in detail in the embodiment of the diagnostic connection device 20, refer to the method provided in the embodiments of the present invention.

An embodiment of the present invention further provides a non-volatile computer readable storage medium storing a computer executable instruction. The computer executable instruction is executed by one or more processors. For example, the diagnostic method in any of the foregoing method embodiments is performed. For example, steps 201 to 204 of the method in FIG. 7 described above are performed to implement functions of the modules 601 to 604 in FIG. 8.

In this embodiment of the present invention, protocol conversion between a physical layer and a data link layer that consumes memory resources and processor resources is run on an automobile diagnostic device 10, and therefore a diagnostic connection device 20 does not need to run the protocol conversion between the physical layer and the data link layer. In this way, a requirement of the diagnostic connection device 20 for hardware performance is lowered and hardware costs of the diagnostic connection device 20 are reduced.

Optionally, in other embodiments of the diagnostic connection device 20, when the protocol conversion between the physical layer and the data link layer is run on the automobile diagnostic device 10, the diagnostic connection device 20 needs to partially perform the protocol conversion between the physical layer and the data link layer. For example, CAN bus protocol data conversion is performed at the automobile diagnostic device 10, and K bus protocol data conversion is performed at the diagnostic connection device 20. The diagnostic connection device 20 may perform the protocol conversion through the processor 25. For example, when the CAN bus protocol data conversion is run on the automobile diagnostic device 10, the processor 25 may further perform the following operations (for the hardware structure diagram of the diagnostic connection device 20, refer to FIG. 10):

converting the diagnostic instruction into standard transmission data corresponding to the diagnostic instruction; and converting the standard transmission data corresponding to the detection data into detection data.

The standard transmission data is K bus protocol standard transmission data.

If the K bus protocol conversion is run on the diagnostic connection device 20, when a user chooses to transmit data through a K bus, the automobile diagnostic device 10 directly sends the diagnostic instruction to the diagnostic connection device 20 through a first communication unit 14. The diagnostic connection device 20 receives the diagnostic instruction through the second communication unit 21, and then converts the diagnostic instruction into standard transmission data that complies with a K bus transmission standard. The communication controller 22 controls the K bus to transmit the standard transmission data to an automobile network 30 through the diagnostic interface 24. Similarly, the diagnostic connection device 20 controls the K bus through the communication controller 22 to receive standard transmission data corresponding to detection data of the automobile network 30 through the diagnostic interface 24, converts the standard transmission data into detection data, and then sends the detection data to the automobile diagnostic device 10 through the second communication unit 21.

Figure 11:
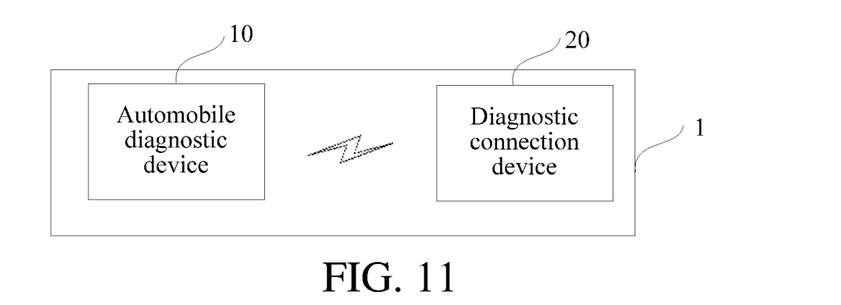
FIG. 11 is a schematic diagram of a hardware structure of an automobile diagnostic system according to an embodiment of the present invention.

An embodiment of the present invention further provides an automobile diagnostic system. As shown in FIG. 11, an automobile diagnostic system 1 includes the foregoing automobile diagnostic device 10 and the foregoing diagnostic connection device 20. The automobile diagnostic device 10 and the automobile diagnostic device 20 may be wiredly connected through a communication serial port, a USB interface, or the like, or may be wirelessly connected through Bluetooth, WI-FI, or the like. For specific technical details of the automobile diagnostic device 10 and the diagnostic connection device 20, refer to the foregoing descriptions of the embodiments of the automobile diagnostic device 10 and the diagnostic connection device 20. Details are not described herein again.

The device embodiments described above are merely example, where the units described as separate components may or may not be physically separated, and the components shown as units may or may not be physical units, that is, may be located at one place, or it can be distributed across a plurality of network elements. Some or all of the modules may be selected according to actual needs to achieve the objective of the solution of this embodiment.

Through the description of the above embodiments, a person of ordinary skill in the art can clearly understand that the embodiments can be implemented by means of software plus a general hardware platform, and certainly, also by hardware. A person of ordinary skill in the art can understand that all or part of the processes in the method of the foregoing embodiments can be completed by a computer program instructing related hardware. The program can be stored in a computer-readable storage medium. When executed, the processes of the embodiments of the methods described above may be included. The storage medium may be a magnetic disk, an optical disk, a read-only memory (ROM), or a random access memory (RAM).

Finally, it should be explained that: the above embodiments are only used to describe the technical solution of the present invention, but not limited thereto; under the idea of the present invention, the technical features in the above embodiments or different embodiments may also be combined. The steps can be implemented in any order, and there are many other variations of different aspects of the invention as described above, for the sake of brevity, they are not provided in the details; although the present invention is described in detail with reference to the foregoing embodiments, those of ordinary skill in the art should understand that: it can still modify the technical solutions described in the foregoing embodiments, or equivalently replace some of the technical features; and these modifications or replacements do not make the essence of the corresponding technical solutions separate from the scope of the technical solutions of the embodiments of the present application.

What is claimed is:

1. An automobile diagnostic method for an automobile diagnostic device, the automobile diagnostic device being configured to connect a diagnostic connection device to obtain detection data from an automobile network through the diagnostic connection device, wherein the diagnostic method comprises:

reading an operation performed by a user on an interface, and converting the operation into a corresponding diagnostic instruction;

converting the diagnostic instruction into standard transmission data corresponding to the diagnostic instruction; and sending the standard transmission data corresponding to the diagnostic instruction;

wherein the sending the standard transmission data corresponding to the diagnostic instruction comprises:

synchronously sending the standard transmission data corresponding to the diagnostic instruction.

2. The diagnostic method according to claim 1, wherein the converting the diagnostic instruction into standard transmission data corresponding to the diagnostic instruction comprises:

converting the diagnostic instruction into controller area network protocol standard transmission data corresponding to the diagnostic instruction, and/or converting the diagnostic instruction into communication bus protocol standard transmission data corresponding to the diagnostic instruction.

3. The diagnostic method according to claim 1, wherein the sending the standard transmission data corresponding to the diagnostic instruction further comprises:

asynchronously sending the standard transmission data corresponding to the diagnostic instruction.

4. The diagnostic method according to claim 3, wherein the standard transmission data comprises more than two data packets; and the asynchronously sending the standard transmission data corresponding to the diagnostic instruction comprises:

registering a sending callback function that is used to call an asynchronous sending function; and calling the asynchronous sending function to send a data packet in the standard transmission data, and performing returning to automatically call the sending callback function after the data packet is sent, so as to call the asynchronous sending function through the sending callback function to send another data packet in the standard transmission data.

5. An automobile diagnostic method for an automobile diagnostic device, the automobile diagnostic device being configured to connect a diagnostic connection device to obtain detection data from an automobile network through the diagnostic connection device, wherein the diagnostic method comprises:
receiving standard transmission data corresponding to the detection data of the automobile network; and
converting the standard transmission data corresponding to the detection data into detection data;
wherein the receiving standard transmission data corresponding to the detection data of the automobile network comprises:
synchronously receiving the standard transmission data corresponding to the detection data of the automobile network.

6. The diagnostic method according to claim 5, further comprising:
parsing the detection data to obtain a diagnosis result.

7. The diagnostic method according to claim 5, wherein the converting the standard transmission data corresponding to the detection data into detection data comprises:
converting controller area network protocol standard transmission data corresponding to the detection data into detection data, and/or converting communication bus protocol standard transmission data corresponding to the detection data into detection data.

8. The diagnostic method according to claim 5, wherein the receiving standard transmission data corresponding to the detection data of the automobile network further comprises:
asynchronously receiving the standard transmission data corresponding to the detection data of the automobile network.

9. The diagnostic method according to claim 8, wherein the standard transmission data comprises more than two data packets; and
the asynchronously receiving the standard transmission data corresponding to the detection data of the automobile network comprises:
registering a receiving callback function that is used to call an asynchronous receiving function; and
after a data packet in the standard transmission data is received, automatically calling the receiving callback function to call the asynchronous receiving function through the receiving callback function to receive the data packet.

10. An automobile diagnostic method for a diagnostic connection device, the diagnostic connection device being configured to connect an automobile diagnostic device and an automobile network, wherein the method comprises:
synchronously receiving standard transmission data that corresponds to a diagnostic instruction and that is sent by the automobile diagnostic device;
sending the standard transmission data corresponding to the diagnostic instruction to the automobile network;
receiving standard transmission data that corresponds to detection data and that is sent by the automobile network; and
synchronously sending the standard transmission data corresponding to the detection data to the automobile diagnostic device.

11. An automobile diagnostic device, comprising:
a display screen;
a first communication unit configured to send and receive data;
at least one processor; and
a memory communicatively connected to the at least one processor, wherein the memory stores an instruction that may be executed by the at least one processor, and when executed by the at least one processor, the instruction causes the at least one processor to read an operation performed by a user on an interface, and converting the operation into a corresponding diagnostic instruction; convert the diagnostic instruction into standard transmission data corresponding to the diagnostic instruction; and synchronously send the standard transmission data corresponding to the diagnostic instruction.

12. A diagnostic connection device, comprising:
a second communication unit configured to send and receive data;
at least one communication controller connected to the second communication unit and configured to control at least one bus to transmit data;
the at least one bus connected to the communication controller and configured to transmit data; and
a diagnostic interface connected to the at least one bus and configured to connect to an automobile network,
the communication controller comprising:
at least one processor; and
a memory communicatively connected to the at least one processor, wherein
the memory stores an instruction that may be executed by the at least one processor, and when executed by the at least one processor, the instruction causes the at least one processor to synchronously receive standard transmission data that corresponds to a diagnostic instruction and that is sent by the automobile diagnostic device; send the standard transmission data corresponding to the diagnostic instruction to the automobile network; receive standard transmission data that is corresponding to detection data and that is sent by the automobile network; and synchronously send the standard transmission data corresponding to the detection data to the automobile diagnostic device.

13. An automobile diagnostic system, comprising:
an automobile diagnostic device which comprises: a display screen; a first communication unit configured to send and receive data; at least one processor; and a memory communicatively connected to the at least one processor, wherein the memory stores an instruction that may be executed by the at least one processor, and when executed by the at least one processor, the instruction causes the at least one processor to read an operation performed by a user on an interface, and converting the operation into a corresponding diagnostic instruction; convert the diagnostic instruction into standard transmission data corresponding to the diagnostic instruction; and synchronously send the standard transmission data corresponding to the diagnostic instruction; and
a diagnostic connection device which comprises: a second communication unit configured to send and receive data; at least one communication controller connected to the second communication unit and configured to control at least one bus to transmit data; the at least one bus connected to the communication controller and configured to transmit data; and a diagnostic interface connected to the at least one bus and configured to connect to an automobile network, the communication controller comprising: at least one processor; and a memory communicatively connected to the at least one processor, wherein the memory stores an instruction that may be executed by the at least one processor, and when executed by the at least one processor, the instruction causes the at least one processor to synchronously receive standard transmission data that corresponds to a diagnostic instruction and that is sent by the automobile diagnostic device; send the standard transmission data corresponding to the diagnostic instruction to the automobile network; receive standard transmission data that corresponds to detection data and that is sent by the automobile network; and synchronously send the standard transmission data corresponding to the detection data to the automobile diagnostic device.

14. A non-volatile computer readable storage medium, wherein the computer readable storage medium stores a computer executable instruction, and when executed by an automobile diagnostic device, the computer executable instruction causes the automobile diagnostic device to read an operation performed by a user on an interface, and convert the operation into a corresponding diagnostic instruction; convert the diagnostic instruction into standard transmission data corresponding to the diagnostic instruction; and synchronously send the standard transmission data corresponding to the diagnostic instruction.

* * * * *